F. E. NELSON.
OIL BURNING APPARATUS.
APPLICATION FILED JAN. 27, 1914.
1,112,025.
Patented Sept. 29, 1914.
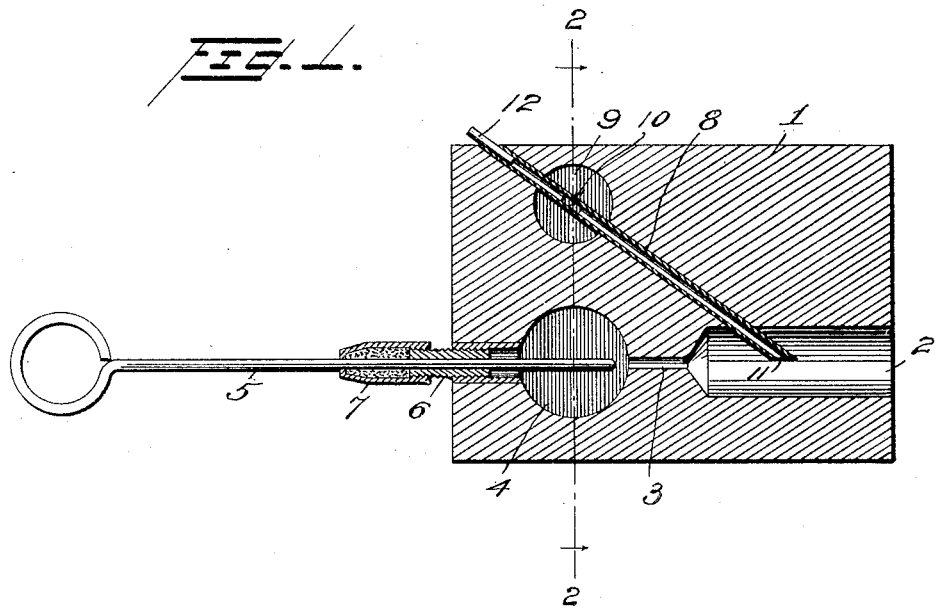
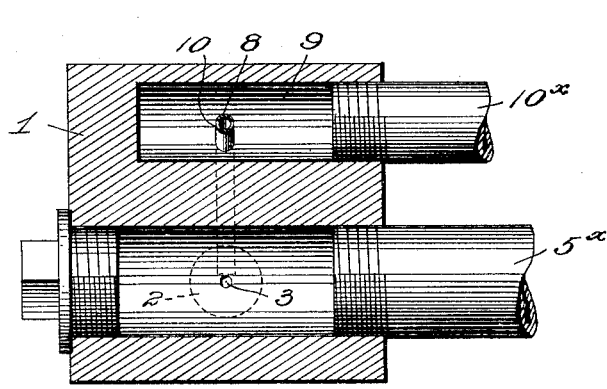
Witnesses
Inventor
Frank E. Nelson,
By James J. Sheehy & Co.,
Attorneys

UNITED STATES PATENT OFFICE.

FRANK E. NELSON, OF LOS ANGELES, CALIFORNIA.

OIL-BURNING APPARATUS.

1,112,025.  Specification of Letters Patent.  Patented Sept. 29, 1914.

Application filed January 27, 1914. Serial No. 814,668.

*To all whom it may concern:*

Be it known that I, FRANK E. NELSON, citizen of the United States, residing at Los Angeles, in the county of Los Angeles and State of California, have invented new and useful Improvements in Oil-Burning Apparatus, of which the following is a specification.

My present invention pertains to oil-burning apparatus; and it contemplates the provision of a simple and durable apparatus embodying such construction and relative arrangement of parts that the oil is conducted clear of anything that might deflect its flow and the discharge end of the oil conduit is licked by the steam discharged from the steam duct which creates a syphonic as well as an atomizing effect, and in that way assures the production of a highly inflammable mixture.

The invention also contemplates the provision of an oil-burning apparatus embodying simple and efficient means for cleaning the oil conduit and the steam duct of the apparatus.

Other advantageous characteristics of the invention will be fully understood from the following description and claim when the same are read in connection with the drawings, accompanying and forming part of this specification, in which:

Figure 1 is a vertical longitudinal section of the construction constituting the best practical embodiment of my invention that I have as yet devised. Fig. 2 is a transverse section taken in the plane indicated by the line 2—2 of Fig. 1.

Similar numerals of reference designate corresponding parts in both views of the drawings.

Among other elements my novel apparatus comprises a body 1 in the form of a block, and in the forward portion of the said body is provided a chamber 2 for the commingling of steam and oil; the said chamber being open at its forward end. Extending rearwardly from the said chamber 2 is a comparatively small steam duct 3 that communicates at its rear end with a chamber 4, designed to be connected through a pipe $5^x$ with a suitable source of steam supply. Normally extending into the steam chamber 4 and arranged in alinement with the steam duct 3 is a cleaning rod 5 which is of a diameter to snugly occupy the said duct 3. The said rod 5 is snugly and removably arranged in a nipple 6, and a stuffing box 7, the nipple being suitably fixed with respect to the block 1, and the stuffing box 7 suitably secured on the nipple. By virtue of this construction, it will be manifest that the rod 5 is always in position for use in the steam duct 3; also, that when desired the said rod can be readily withdrawn and inserted in the oil conduit 8 to clear the latter.

Formed in the body 1 at a point above the steam chamber 4 is a chamber 9 designed to be connected through a pipe $10^x$ with a source of oil supply. The conduit 8 extends obliquely through the said chamber 9, and is provided at 10 with a port through which oil is free to pass from the chamber into the conduit. The upper end of the conduit 8 is flush with the top of the body 1, and the lower end of said conduit is beveled, as indicated by 11, and is arranged in the same horizontal plane as the uppermost portion of the steam duct 3 in front of which it is disposed. Normally the upper and outer end of the conduit 8 is closed by a plug 12, said plug being removed when it is necessary to push the cleaning rod 5 through the conduit 8.

It will be understood from the foregoing that in the operation of the apparatus, the jet of steam from the steam duct 3 will sweep or wipe past the discharge end of the conduit 8, and by so doing will create a suction at the said point, and at the same time will atomize the oil so that the resulting mixture discharged from the chamber 2 will be highly inflammable. It will also be manifest that the sweeping of the steam directly past and at an angle to the discharge end of the conduit 8, will tend to keep said discharge end clear and in that way will assure the supply of an adequate quantity of oil at all times to the steam in the chamber 2.

I prefer in practice to depend on frictional contact to retain the conduit 8 in the body or block 1, but it is manifest that the conduit 8 may be secured in the body or block in any other approved manner without affecting my invention.

The chamber 4 is shown as closed at its outer end by a plug, and it is obvious that the chamber 9 may be similarly closed at its outer end, if desired. It is also obvious that my invention is not confined to the arrangement of the chambers, ducts, etc., in a block-like body.

Having described by invention, what I claim and desire to secure by Letters-Patent, is:

An oil burning apparatus comprising a body having a mixing chamber that is open at its forward end, and a steam-receiving chamber located back of the first-named chamber, and a comparatively small steam duct intermediate said chambers, and also having an oil-receiving chamber located above and in the same vertical plane as the steam-receiving chamber; an oil conduit extending obliquely through the oil-receiving chamber and having a port in communication therewith and also having a beveled discharge end in the mixing chamber and arranged in the same horizontal plane as the uppermost portion of the steam duct; removable means for normally closing the outer end of the oil conduit; packing means connected with the body; and a cleaning rod removably arranged in said packing means and in alinement with the steam duct.

In testimony whereof I have hereunto set my hand in presence of two subscribing witnesses.

FRANK E. NELSON.

Witnesses:
R. L. STEARNS,
L. L. CARPENTER.

Copies of this patent may be obtained for five cents each, by addressing the "Commissioner of Patents, Washington, D. C."